United States Patent [19]

Smulders

[11] Patent Number: 4,711,519
[45] Date of Patent: Dec. 8, 1987

[54] ASSEMBLY INCLUDING AN OPTICAL FIBER SECURED IN A WALL

[75] Inventor: Henricus W. W. Smulders, Eindhoven, Netherlands

[73] Assignee: U.S. Philips Corporation, New York, N.Y.

[21] Appl. No.: 948,468

[22] Filed: Dec. 29, 1986

Related U.S. Application Data

[63] Continuation of Ser. No. 802,785, Nov. 27, 1985, abandoned.

[30] Foreign Application Priority Data

Dec. 5, 1984 [NL] Netherlands .......................... 8403692

[51] Int. Cl.⁴ ................................................. G02B 5/44
[52] U.S. Cl. ................................. 350/96.20; 439/552
[58] Field of Search ........................... 350/96.20, 96.21; 339/126 R; 439/552

[56] References Cited

U.S. PATENT DOCUMENTS

| | | | |
|---|---|---|---|
| 2,325,621 | 8/1943 | Miller | 339/126 R |
| 4,217,031 | 8/1980 | Mignien et al. | 350/96.21 |
| 4,327,964 | 5/1982 | Haesly et al. | 350/96.20 |
| 4,597,632 | 7/1986 | Mallinson | 350/96.21 |

FOREIGN PATENT DOCUMENTS 2939231 4/1981 Fed. Rep. of Germany .

*Primary Examiner*—Eugene F. Desmond
*Attorney, Agent, or Firm*—Marc D. Schechter

[57] ABSTRACT

In order to simply attach an optical fiber in a wall, the end porton of the fiber is enclosed by a tubular envelope. The envelope is accommodated in a holder which projects through an opening in the wall. The holder is rotatable about its longitudinal axis. The outer cylinder surface of the holder is provided with a circumferential groove. In two diametrically opposed portions, the depth of this circumferential groove is greater than the thickness of the wall of the holder so that two elongate openings are formed in the wall of the holder. The outer surface of the tubular envelope is also provided with a circumferential groove whose axial position coincides with that of the circumferential groove in the holder. A U-shaped spring is attached to the wall so that its legs are situated in the circumferential groove in the holder at the area of the elongate openings. The spring force presses the legs through these openings into the circumferential groove in the envelope so that the envelope is retained in the holder.

4 Claims, 4 Drawing Figures

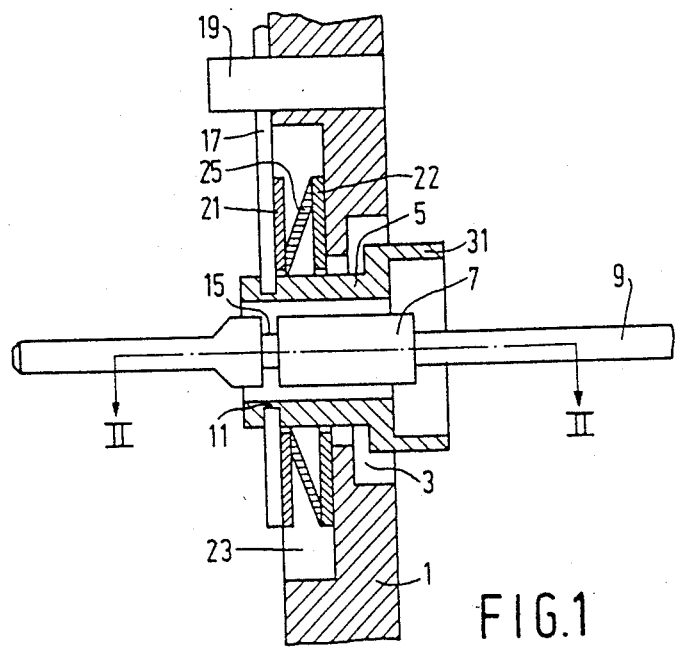
FIG.1
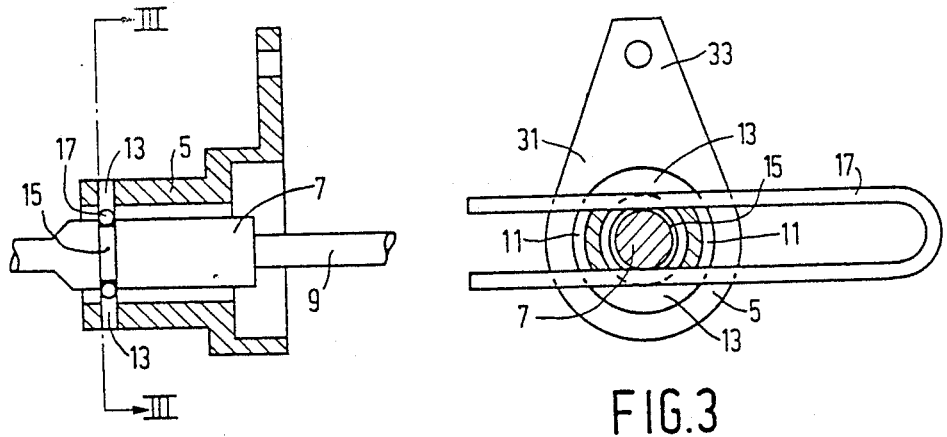
FIG.2
FIG.3
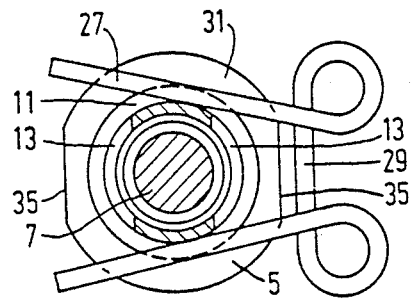
FIG.4

ASSEMBLY INCLUDING AN OPTICAL FIBER SECURED IN A WALL

This is a continuation of application Ser. No. 802,785, filed Nov. 27, 1985, now abandoned.

BACKGROUND OF THE INVENTION

The invention relates to an optical fiber connector assembly. The assembly includes a wall in which an end portion of an optical fiber, which is enclosed by a tubular envelope, is secured.

The wall may form part of, for example, a housing of a connector for connecting the optical fiber to other optical elements or another device. It is desirable that the tubular envelope can be mounted in the wall in a simple manner. In many cases it is also important that the assembly can be simply removed again, for example, when maintenance, modifications or repairs are required after some time.

SUMMARY OF THE INVENTION

It is an object of the invention to provide a detachable optical fiber connector in which the envelope can be secured in the wall and removed therefrom in a very easy manner.

To achieve this, in the assembly according to the invention the tubular envelope is accommodated with a clearance in a holder which is shaped as a hollow cylinder. The holder projects through an opening in the wall, is rotatable about its longitudinal axis, and is provided with a circumferential groove on its outer cylinder surface. The depth of the groove at two diametrically opposed portions is greater than the wall thickness of the holder so that two elongate openings are formed in the wall of the holder. The openings extend in the circumferential direction.

The outer surface of the tubular envelope is also provided with a circumferential groove whose axial position coincides with that of the circumferential groove in the holder. An essentially U-shaped spring is attached to the wall so that its legs are situated in the circumferential groove of the holder at the area of the elongate openings. The spring force then presses the legs into the circumferential groove in the envelope through the openings in the holder.

The legs of the spring retain the envelope in the holder. When the holder is rotated 90° about its axis, the legs will be situated in portions of the circumferential groove of the holder which have not been recessed so far that they form openings. As a result, the legs are lifted out of the circumferential groove in the envelope so that the envelope can be simply pulled out of the holder.

In order to facilitate rotation of the holder, in a preferred embodiment of the assembly according to the invention the holder is provided with a non-round portion which projects from the wall. For example, the non-round portion may be provided with a profile which can be engaged by a tool or with a protrusion which can be turned by hand.

BRIEF DESCRIPTION OF THE DRAWING

FIG. 1 is a partly longitudinal sectional view and a partly side elevational view of a first embodiment of an assembly according to the invention;

FIG. 2 is a partly side elevational view and a partly longitudinal sectional view, taken along the line II—II in FIG. 1, of a part of the assembly shown in FIG. 1;

FIG. 3 is a cross-sectional view taken along the line III—III in FIG. 2;

FIG. 4 is a cross-sectional view, corresponding to that shown in FIG. 3, of a second embodiment of the invention.

DESCRIPTION OF THE PREFERRED EMBODIMENTS

FIG. 1 shows a portion of a wall 1 which forms part of a housing, for example a connector housing. In the wall 1 there is formed a round opening 3 through which a holder 5 projects. The holder 5 is a hollow cylinder and is rotatable about its longitudinal axis in the opening 3. The holder 5 accommodates a tubular envelope 7 with some clearance. An end portion of an optical fiber 9 is secured in the envelope.

On the outer cylindrical surface of the holder 5 there is provided a circumferential groove 11. The depth of groove 11 at two diametrically opposed portions is greater than the wall thickness of the holder 5. Consequently, these portions form two elongate openings 13 in the wall of the holder 5. These openings extend in the circumferential direction (See, FIGS. 2 and 3.)

The outer surface of the tubular envelope 7 of the optical fiber 9 is also provided with a circumferential groove 15. The envelope 7 is arranged in the holder 5 so that the axial positions of the circumferential grooves 11 and 15 coincide.

To the wall 1 there is also attached an essentially U-shaped spring 17. Spring 17 is attached to wall 1, for example, by a pin 19 which projects from the wall 1. The legs of the spring 17 are arranged in the circumferential groove 11 of the holder 5, that is to say at the area of the elongate openings 13. The spring 17 is proportioned so that when they are not in tension, the distance between the legs is smaller than the diameter of the tubular envelope 7 at the area of the circumferential groove 15 provided therein.

Consequently, the spring force presses the legs into the circumferential groove 15 of the envelope 7 through the openings 13. The spring 17 thus retains the envelope 7 in the holder 5. Because the legs of the spring 17 are also arranged in the circumferential groove 11 of the holder 5, the holder 5 is also retained in the axial direction by the spring 17.

The holder 5 is also inserted through two rings 21 and 22 which are accommodated in a chamber 23 recessed in the wall 1. Between the rings 21 and 22 there is arranged a conical, resilient ring 25 so that the spring 17, the holder 5 and the envelope 7 have some freedom of movement in the axial direction. This is important, for example in connectors, in order to compensate for tolerances.

The spring 17 of the embodiment shown in the FIGS. 1 to 3 is substantially truly U-shaped. In order to avoid excessive rigidity of the legs, the spring must be comparatively long. When a spring having a smaller length is preferred, another spring construction can be chosen, for example as shown in FIG. 4.

The spring 27 shown in FIG. 4 is again essentially U-shaped, but at the area of the transition between the base and the legs it is bent through an angle of 270° instead of 90° as in the case of the spring 17. Thus, equally flexible legs are obtained even though the length of the spring is smaller. The width, however, is slightly larger and the thickness (the dimension in the axial direction) is doubled. The spring 27 can be secured to the wall 1, for example, by pressing the straight portion 29 of the base into a groove in the wall (not shown).

When the holder 5 is rotated approximately 90° about its longitudinal axis, the legs of the spring 17 or 27 engage the bottom of the groove 11 because the openings 13 are turned away, and because the spring cannot rotate together with the holder because it is secured to the wall 1 near its base. The legs of the spring 17 or 27 are thus pressed apart as shown in FIG. 4. Consequently, the legs are lifted out of the circumferential groove 15 in the tubular envelope 7 of the optical fiber 9. As a result, the envelope will be loosely disposed in the holder 5 so that it can be easily pulled out of the holder.

When the envelope 7 is to be mounted in the holder 5, the holder 5 is first moved to the position in which it has been rotated through 90° as shown in FIG. 4. After this, the envelope 7 is slid into the holder 5 so far that the axial position of its circumferential groove 15 coincides with that of the circumferential groove 11 of the holder. Subsequently, the holder 5 is rotated through 90° again so that the legs of the spring 17 or 27 are forced into the circumferential groove 15 of the envelope 7 via the openings 13.

It is alternatively possible to slide the envelope 7 into the holder 5 so far that its circumferential groove 15 is situated beyond the circumferential groove 11 of the holder. After rotation of the holder 5, the legs of the spring 17 or 27 will then rest on the outer surface of the envelope 7. When the envelope 7 is subsequently pulled back slightly, the legs of the spring 17 or 21 will be automatically forced into the circumferential groove 15.

In order to facilitate rotation of the holder 5, the holder is preferably provided with a non-round portion 31 which projects from the wall 1. As shown in FIG. 3, this portion may be provided with a protrusion 33 for rotating the holder 5 by hand. Alternatively the non-round portion 31 may have a profile which can be engaged by a tool (for example, a wrench). Such a profile may consist of, for example, two opposite, parallel surfaces 35 (see FIG. 4).

What is claimed is:

1. An assembly for holding an end of optical fiber, said assembly comprising:
   a housing with a wall having an opening therethrough;
   a hollow cylindrical holder arranged in the opening in the wall of the housing, said holder having a longitudinal axis and being rotatable around the longitudinal axis with respect to the wall of the housing, said holder having an outer surface with a circumferential groove therein, said holder having a wall with a thickness, said groove having a depth at diametrically opposed portions of the holder which exceeds the thickness of the wall of the holder so as to form two circumferentially extending elongate openings in the holder;
   a tubular envelope in which the end of the fiber is secured, said envelope being arranged in the holder to slide in the longitudinal direction, said envelope having an outer surface with a circumferential groove therein, said groove having an axial position corresponding to that of the groove in the holder; and
   a substantially U-shaped spring attached to the wall of the housing, said spring having two legs pressed into the groove in the holder.

2. An assembly as claimed in claim 1, characterized in that the holder has a non-round portion which projects from the wall.

3. An assembly for holding an end of optical fiber, said assembly comprising:
   a housing with a wall having an opening therethrough;
   a hollow cylindrical holder arranged in the opening in the wall of the housing, said holder having a longitudinal axis and being rotatable around the longitudinal axis with respect to the wall of the housing, said holder having an outer surface with a circumferential groove therein, said holder having a wall with a thickness, said groove having a depth at diametrically opposed portions of the holder which exceeds the thickness of the wall of the holder so as to form two circumferentially extending elongate openings in the holder;
   a tubular envelope in which the end of the fiber is secured, said envelope being arranged in the holder, said envelope having an outer surface with a circumferential groove therein, said groove having an axial position corresponding to that of the groove in the holder; and
   a substantially U-shaped spring attached to the wall of the housing, said spring having two legs which may be pressed into the groove in the holder in order to fix the envelope in the holder in the longitudinal direction.

4. An assembly as claimed in claim 3, characterized in that the holder has a non-round portion which projects from the wall.

* * * * *